United States Patent
Deng

(10) Patent No.: US 12,209,878 B2
(45) Date of Patent: Jan. 28, 2025

(54) NAVIGATION METHOD, ELECTRONIC DEVICE AND READABLE STORAGE MEDIUM

(71) Applicant: APOLLO INTELLIGENT CONNECTIVITY (BEIJING) TECHNOLOGY CO., LTD., Beijing (CN)

(72) Inventor: Sunan Deng, Beijing (CN)

(73) Assignee: APOLLO INTELLIGENT CONNECTIVITY (BEIJING) TECHNOLOGY CO., LTD., Beijing (CN)

( * ) Notice: Subject to any disclaimer, the term of this patent is extended or adjusted under 35 U.S.C. 154(b) by 201 days.

(21) Appl. No.: 17/853,495

(22) Filed: Jun. 29, 2022

(65) Prior Publication Data

US 2022/0412761 A1    Dec. 29, 2022

(30) Foreign Application Priority Data

Jun. 29, 2021  (CN) .......................... 202110731632.5

(51) Int. Cl.
*G01C 21/36* (2006.01)
*G06T 7/33* (2017.01)
(Continued)

(52) U.S. Cl.
CPC ............ *G01C 21/365* (2013.01); *G06T 7/337* (2017.01); *G06T 7/74* (2017.01); *G06T 19/006* (2013.01); *G06T 2207/30248* (2013.01)

(58) Field of Classification Search
None
See application file for complete search history.

(56) References Cited

U.S. PATENT DOCUMENTS

| 9,240,069 B1* | 1/2016 | Li ...................... G02B 27/017 |
| 9,928,653 B2 | 3/2018 | Atsmon |

(Continued)

FOREIGN PATENT DOCUMENTS

| CN | 207198469 | 4/2018 |
| CN | 108036796 | 5/2018 |

(Continued)

OTHER PUBLICATIONS

Rao et al.; "AR-IVI—Implementation of In-Vehicle Augmented Reality;" IEEE International Symposium on Mixed and Augmented Reality 2014; Science and Technology Proceedings; Sep. 10-12, 2014, Munich, Germany; 6 pages (Year: 2014).*

(Continued)

*Primary Examiner* — Edward Martello
(74) *Attorney, Agent, or Firm* — Pillsbury Winthrop Shaw Pittman, LLP

(57) ABSTRACT

A navigation method, an electronic device and a readable storage medium, which relate to a field of vehicle networking technology, and in particular to a field of navigation technology. The navigation method includes: acquiring a real world image and a navigation information; converting the real world image to obtain a projection image, wherein the projection image is matched with an eyebox of at least one pair of vehicle-mounted glasses; superimposing the navigation information on the projection image to obtain a navigation image; and transmitting to the vehicle-mounted glasses the navigation image so that the navigation image is displayed by the vehicle-mounted glasses.

20 Claims, 4 Drawing Sheets

(51) Int. Cl.
*G06T 7/73* (2017.01)
*G06T 19/00* (2011.01)

(56) References Cited

U.S. PATENT DOCUMENTS

| | | | | |
|---|---|---|---|---|
| 10,282,915 | B1* | 5/2019 | Lin | G02B 27/01 |
| 10,332,292 | B1* | 6/2019 | Arnicar | G06F 3/011 |
| 10,950,002 | B2 | 3/2021 | Oami et al. | |
| 11,263,456 | B2* | 3/2022 | Ishihara | G06T 19/006 |
| 2015/0100179 | A1* | 4/2015 | Alaniz | G06F 3/011 |
| | | | | 701/1 |
| 2015/0286055 | A1 | 10/2015 | Giartosio et al. | |
| 2020/0090375 | A1* | 3/2020 | Mori | G06T 11/00 |
| 2020/0234470 | A1 | 7/2020 | Chen et al. | |
| 2020/0286259 | A1 | 9/2020 | Oami et al. | |
| 2021/0055548 | A1* | 2/2021 | Rao | G02B 26/0875 |

FOREIGN PATENT DOCUMENTS

| | | |
|---|---|---|
| CN | 108766002 | 11/2018 |
| CN | 110076277 | 8/2019 |
| CN | 110544388 | 12/2019 |
| CN | 111554108 | 8/2020 |
| CN | 112507799 | 3/2021 |
| DE | 102016120425 | 4/2017 |
| JP | 2009278234 | 11/2009 |
| JP | 2015204616 | 11/2015 |
| JP | 2020182246 | 11/2020 |
| KR | 1020170082757 | 7/2017 |
| WO | 2013/114617 | 8/2013 |
| WO | 2017115587 | 7/2017 |

OTHER PUBLICATIONS

Chinese Office Action issued in corresponding Chinese Patent Application No. 202110731632.5, dated Jun. 5, 2023.
Japanese Office Action issued in corresponding Japanese Patent Application No. 2022-103647, dated Jul. 25, 2023.
European Search Report issued in corresponding European Patent Application No. 22181994.9, dated Nov. 29, 2022.
Notice of Preliminary Rejection issued in corresponding Korean Patent Application No. 10-2022-0078507, dated Jul. 18, 2024.

* cited by examiner

NAVIGATION METHOD, ELECTRONIC DEVICE AND READABLE STORAGE MEDIUM

This application claims priority to Chinese Patent Application No. 202110731632.5, filed on Jun. 29, 2021, the entire contents of which is incorporated herein in its entirety by reference.

TECHNICAL FIELD

The present disclosure relates to a field of vehicle networking technology, and in particular to a field of navigation technology. Specifically, the present disclosure relates to a navigation method, an electronic device, and a readable storage medium.

BACKGROUND

As AR (Augmented Reality) technology is more and more widely used, users' acceptance of AR applications is also higher and higher. An important application of the AR technology is the application of AR navigation.

When a content of the AR navigation is projected onto a pair of vehicle-mounted glasses, as the user's head may shake, there may be a certain position offset between a projected AR navigation information and an image observed by the users, which may affect an effect of the AR navigation and the users' experience.

SUMMARY

A navigation method, an electronic device, and a readable storage medium are provided.

According to a first aspect of the present disclosure, a navigation method is provided, and the method includes: acquiring a real world image and a navigation information; converting the real world image to obtain a projection image, wherein the projection image is matched with an eyebox of at least one pair of vehicle-mounted glasses; superimposing the navigation information on the projection image to obtain a navigation image; and transmitting to the vehicle-mounted glasses the navigation image so that the navigation image is displayed by the vehicle-mounted glasses.

According to a second aspect of the present disclosure, another navigation method is provided, and the method includes: receiving a navigation image transmitted by an in-vehicle infotainment system, wherein the navigation image is obtained by superimposing a navigation information on a projection image, the projection image is obtained by converting a real world image, and the projection image is matched with an eyebox of at least one pair of vehicle-mounted glasses; and displaying the navigation image.

According to a third aspect of the present disclosure, an electronic device is provided, and the electronic device includes: at least one processor; and a memory communicatively connected with the at least one processor; wherein the memory stores instructions executable by the at least one processor, and the instructions, when executed by the at least one processor, cause the at least one processor to implement the navigation method described above.

According to a fourth aspect of the present disclosure, a non-transitory computer-readable storage medium having computer instructions stored thereon is provided, wherein the computer instructions are configured to cause a computer to implement the navigation method described above.

It should be understood that the content described in this section is not intended to characterize key or vital features of embodiments of the present disclosure, rather than limiting the scope of the present disclosure. Other features will become easily understood through the following specification.

BRIEF DESCRIPTION OF THE DRAWINGS

The accompanying drawings are used to better understand the solution, and do not constitute a limitation to the present disclosure, in which.

DETAILED DESCRIPTION OF EMBODIMENTS

Exemplary embodiments of the present disclosure are described below with reference to the accompanying drawings, in which various details of embodiments of the present disclosure are included to facilitate understanding, and they should be considered as exemplary only. Accordingly, those of ordinary skilled in the art should realize that various changes and modifications may be made to embodiments described herein without departing from the scope and spirit of the present disclosure. Also, descriptions of well-known functions and structures are omitted from the following descriptions for clarity and conciseness.

An existing AR navigation is generally projected on a screen of the In-vehicle Infotainment (IVI) system or an Augmented Reality Head Up Display (AR HUD). There are certain defects in existing manners, which may affect the user's experience.

For the AR navigation projected on the screen of the IVI system, a navigation information is not fused with a real world scene, but is fused with a video, which is not actually a real world scene superimposition, and it is necessary for a driver to look down at the screen to acquire the navigation information.

For the AR navigation displayed on the AR HUD, a field of view (FOV) that the AR HUD may achieve is small, a contrast of an image under a strong light is significantly reduced, and an eyebox projected by the HUD is relatively fixed, thus a complete image may not be observed out of the eyebox to a certain extent.

If the AR navigation information may be projected on Mediated Reality (MR) glasses, the above-mentioned defects of projecting AR navigation on the screen of the IVI system or the head-up display may be overcome.

A positioning chip and an image generation unit are independently coupled to the existing MR glasses. However, in the vehicle field, if it is desired to display a relevant navigation information, providing the positioning chip such as a Global Positioning System (GPS), an Inertial Measurement Unit (IMU) on the glasses will increase a weight of the glasses and cause the device to be bulky.

In the existing AR navigation, the real world image is generally captured by a camera of the IVI system, and then the navigation information is generated according to the real world image. For example, a content of the AR navigation is projected on the vehicle-mounted glasses, as the user's head may shake, there may be a certain position offset between a projected AR navigation information and an image observed by the user, which may affect an effect of the AR navigation and affect the user's experience.

The navigation method and apparatus, the electronic device, and the computer-readable storage medium provided by embodiments of the present disclosure are intended to solve at least one of the above technical problems in the related art.

Figure 1:
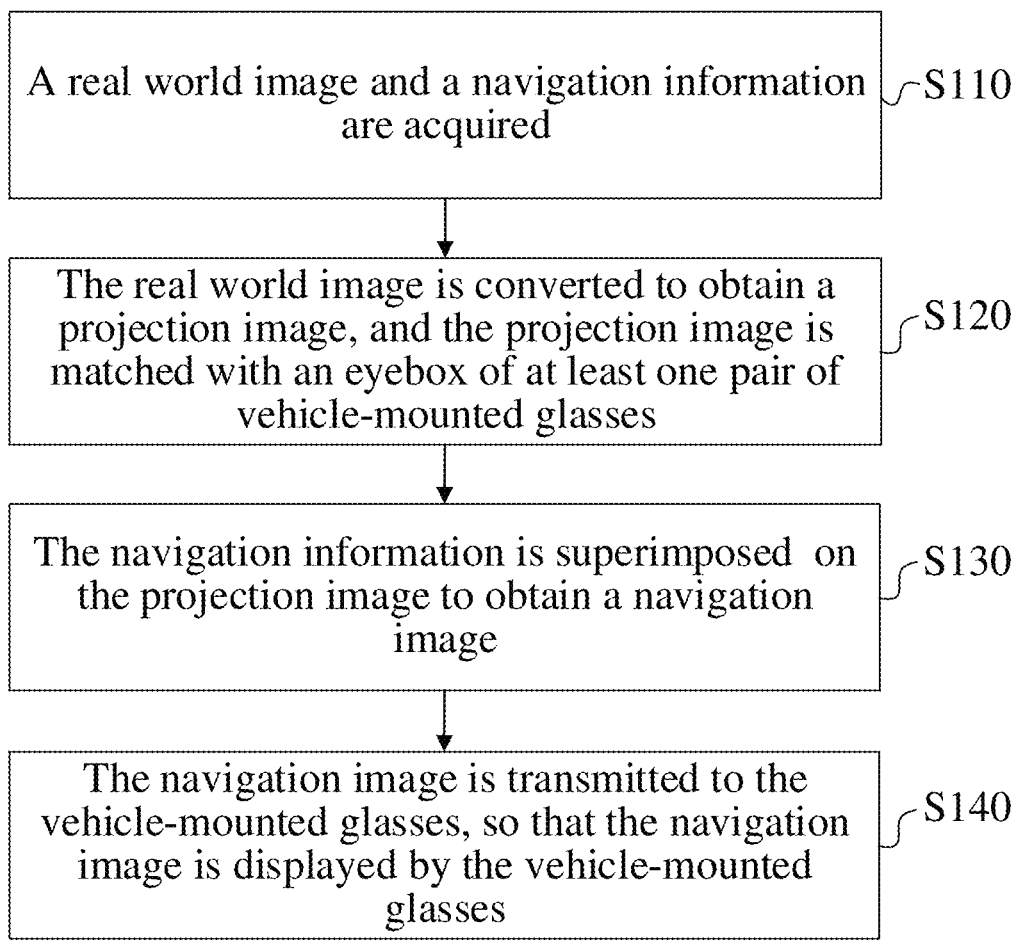
FIG. 1 shows a schematic flowchart of a navigation method provided by an embodiment of the present disclosure.

FIG. 1 shows a schematic flowchart of a navigation method provided by an embodiment of the present disclosure. As shown in FIG. 1, the method may mainly include step S110 to step S140.

In step S110, a real-world image and a navigation information are acquired.

In step S120, the real world image is converted to obtain a projection image, and the projection image is matched with an eyebox of at least one pair of vehicle-mounted glasses.

In step S130, the navigation information is superimposed on the projection image to obtain a navigation image.

In step S140, the navigation image is transmitted to the vehicle-mounted glasses, so that the navigation image is displayed by the vehicle-mounted glasses.

The real world image is an image of an environment surrounding a vehicle. The navigation information may be superimposed on the real world image to obtain the navigation image. The navigation information may be an information presented in the navigation image and used for navigating or prompting the user, and may include an Advanced Driving Assistance System (ADAS) information, a high definition map information, and the like.

As an example, the navigation information may contain a steering arrow used to instruct the vehicle to turn, or may be an information (a building name, etc.) of a building contained in a Point of Information (POI).

The vehicle-mounted glasses may include, but not limited to, smart glasses such as the MR glasses. The vehicle-mounted glasses may be worn by the user when driving the vehicle, and the navigation may be achieved by using the vehicle-mounted glasses.

In the navigation system provided in embodiments of the present disclosure, a plurality of vehicle-mounted glasses may be equipped in the vehicle to meet usage requirements of a plurality of users.

When the user wears the vehicle-mounted glasses, a visible area of the user's eyes corresponds to the eyebox of the vehicle-mounted glasses. Therefore, the real world image may be converted to obtain a projection image matched with the eyebox of the vehicle-mounted glasses, and the projection image is matched with the visible area of the user's eyes. The AR navigation is performed based on superimposing the navigation information on the projection image, which may ensure the effect of the AR navigation, provide the augmented reality experience to the user, and avoid affecting the effect of the AR navigation due to a movement of the user's head.

In practice, as a position of the user's head may change at any time, an adjustment period may be set, and the real world image is periodically converted to ensure the effect of the AR navigation. As an example, the adjustment period may be two seconds.

In embodiments of the present disclosure, after the navigation image is generated, the navigation image may be transmitted to the vehicle-mounted glasses, and the navigation image may be displayed through the vehicle-mounted glasses to achieve the AR navigation. The AR navigation being projected on the vehicle-mounted glasses may overcome the defects of projecting the AR navigation on the screen of the IVI system or the AR HUD in the related art, and may improve the user's experience.

In the method provided by embodiments of the present disclosure, the real world image and the navigation information are acquired; the real world image is converted to obtain the projection image, the projection image is matched with the eyebox of at least one pair of vehicle-mounted glasses; the navigation information is superimposed on the projection image to obtain the navigation image; and the navigation image is transmitted to the vehicle-mounted glasses, and displayed by the vehicle-mounted glasses. In the solution, the AR navigation is implemented based on the vehicle-mounted glasses, and an influence on the effect of the AR navigation caused by the change of the position of the user's head may be avoided, so as to ensure the effect of the AR navigation and the user's experience.

In an optional implementation of the present disclosure, if the real world image is a first real world image captured by a first image capturing device of the IVI system, converting the real world image to obtain the projection image including the following: a first positional relationship between a second real world image captured by a second image capturing device of the vehicle-mounted glasses and the eyebox of the vehicle-mounted glasses is acquired; a second positional relationship between the first real world image and the second real world image is determined; and the first real world image is converted to obtain the projection image, based on the first positional relationship and the second positional relationship.

In embodiments of the present disclosure, the real world image may be captured by the first image capturing device of the IVI system, or may be captured by the second image capturing device of the vehicle-mounted glasses.

The image capturing device may include, but are not limited to, a camera.

When the real world image is the first real world image captured by the first image capturing device of the IVI system, as the position of the second image capturing device of the vehicle-mounted glasses and the position the eyebox of the vehicle-mounted glasses are fixed, the first positional relationship between the second real world image and the eyebox of the vehicle-mounted glasses is determined based on an actual positional relationship between the second image capturing device and the eyebox of the vehicle-mounted glasses.

As the position of the user's head may change in real time, the second positional relationship between the first real world image and the second real world image also changes in real time, and the second positional relationship may be periodically acquired according to the adjustment period.

After the first positional relationship and the second positional relationship are determined, the first real world image may be converted to obtain the projection image according to the first positional relationship and the second positional relationship.

As an example, the first positional relationship may be represented by [R1 T1], wherein R is a rotation matrix and T is a translation matrix, then P (eyebox)=[R1 T1] P (camera2) is obtained. Here, [R1 T1] is a determined quantity, P (eyebox) represents the projection image, and P (camera2) represents the second real world image.

The second positional relationship may be represented by [R2 T2], then P (camera2)=[R2 T2] P (camera1) is obtained, wherein P (camera1) represents the first real world image, and P (camera2) represents the second real world image.

Thereby, it may be deduced that P (eyebox)=[R1 T1] P (camera2)=[R1 T1] [R2 T2] P(camera1).

In an optional implementation of the present disclosure, determining the second positional relationship between the first real world image and the second real world image includes any of the followings: feature point tracking is performed on the first real world image and the second real world image, and the second positional relationship between the first real world image and the second real world image is determined based on a first result of the feature point tracking; or feature point tracking is performed on a third real world image which is captured when the vehicle-mounted glasses is located at a specified position and the first real world image, a third positional relationship between the first real world image and the third real world image is determined based on a second result of the feature point tracking, and the second positional relationship between the first real world image and the second real world image is determined, based on a current position of the vehicle-mounted glasses, the specified position, and the third positional relationship.

In embodiments of the present disclosure, the second positional relationship may be acquired by means of feature point tracking such as PNP solution, etc. Specifically, that is, continuous comparing, tracking and solving may be performed on the feature points of the first real world image with the feature points of the second real world image. A result of the solving may be recorded as: P (camera2)=[R2 T2] P (camera1).

For a real-time processing, it is necessary to control a time delay of the solving process, and the first real world image and the second real world image may be transmitted to a Microcontroller Unit (MCU) of the IVI system for processing.

In embodiments of the present disclosure, a generation of the navigation image may be completed in the IVI system, and then the navigation image is transmitted to the vehicle-mounted glasses, so that the vehicle-mounted glasses do not need to be configured with too many sensors, and the vehicle-mounted glasses may be avoided from being bulky.

In embodiments of the present disclosure, a specified position of the user in the vehicle may also be set, and the specified position may be used as a reference to calculate the third positional relationship between the third real world image which is captured when the vehicle-mounted glasses is located at the specified position and the first real world image. Then, the vehicle-mounted glasses are positioned in real time, a position change of the vehicle-mounted glasses with respect to the specified position is calculated, and the second positional relationship may be determined according to the positional change and the third positional relationship.

In practice, the third positional relationship may be acquired by image feature point tracking.

As an example, a position of the vehicle-mounted glasses when a driver is sitting upright and wearing the vehicle-mounted glasses may be used as the specified position. The image feature point tracking is used to acquire an initial value of the relationship P (camera2)=[R20 T20] P (camera1). In a dynamic process, a relative position change [Rx Tx] is obtained by a positioning system, then P (camera2) =[Rx Tx] [R20 T20] P (camera1) is obtained.

In an optional implementation of embodiments of the present disclosure, the current position of the vehicle-mounted glasses is acquired based on the positioning system of the vehicle-mounted glasses.

In embodiments of the present disclosure, the positioning system of the vehicle-mounted glasses may include a positioning chip such as GPS/IMU, etc.

In an optional implementation of embodiments of the present disclosure, if the real world image is the second real world image captured by the second image capturing device of the vehicle-mounted glasses, converting the real world image to obtain the projection image includes the following: the first positional relationship between the second real world image captured by the second image capturing device of the vehicle-mounted glasses and the eyebox of the vehicle-mounted glasses is acquired; and the first real world image is converted to obtain the projection image based on the first positional relationship.

In embodiments of the present disclosure, when the real world image is the second real world image captured by the second image capturing device of the vehicle-mounted glasses, as a position of the second image capturing device of the vehicle-mounted glasses and a position the eyebox of the vehicle-mounted glasses are fixed, the first positional relationship between the second real world image and the eyebox of the vehicle-mounted glasses is determined based on an actual positional relationship between the second image capturing device and the eyebox of the vehicle-mounted glasses.

As an example, P (eyebox)=[R1 T1] P (camera2), wherein P (eyebox) represents the projection image, P (camera2) represents the second real world image, and the first positional relationship may be represented by [R1 T1].

In an optional implementation of embodiments of the present disclosure, transmitting the navigation image to the vehicle-mounted glasses includes: transmitting the navigation image to the vehicle-mounted glasses through wireless communication.

The wireless communication manner may be Wireless Fidelity (WiFi). Alternatively, the transmission of the navigation image may be performed through a wired manner, such as a Universal Serial Bus (USB) interface or a Low-Voltage Differential Signaling (LVDS) interface and other manners.

Figure 2:
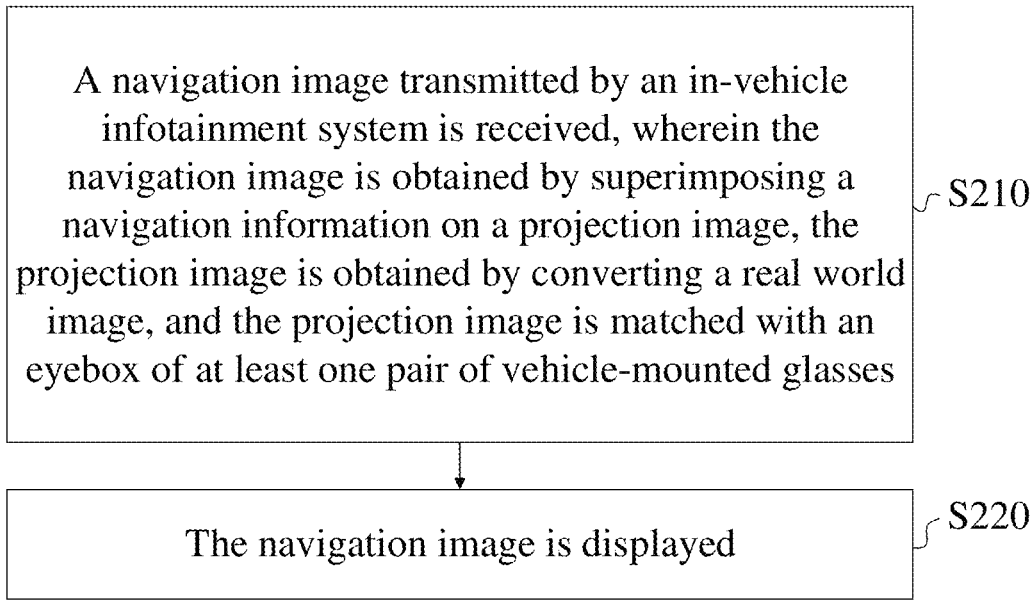
FIG. 2 shows a schematic flowchart of another navigation method provided by an embodiment of the present disclosure.

FIG. 2 shows a schematic flowchart of another navigation method provided by an embodiment of the present disclosure. As shown in FIG. 2, the method may mainly include step S210 and step S220.

In step S210, a navigation image transmitted by an IVI system is received, wherein the navigation image is obtained by superimposing a navigation information on a projection image, the projection image is obtained by converting a real world image, and the projection image is matched with an eyebox of at least one pair of vehicle-mounted glasses.

In step S220, the navigation image is displayed.

The real world image is an image of an environment surrounding a vehicle. The navigation information may be superimposed on the real world image to obtain the navigation image. The navigation information may be an information presented in the navigation image and used for navigating or prompting the user, and may include an Advanced Driving Assistance System (ADAS) information, a high definition map information, and the like.

As an example, the navigation information may contain a steering arrow used to instruct the vehicle to turn, or may be an information (a building name, etc.) of a building in a Point of Information (POI).

The vehicle-mounted glasses may include, but not limited to, smart glasses such as the MR glasses. The vehicle-mounted glasses may be worn by the user when driving the vehicle, and the navigation may be achieved by using the vehicle-mounted glasses.

In the navigation system provided in embodiments of the present disclosure, a plurality of vehicle-mounted glasses may be equipped in the vehicle to meet usage requirements of a plurality of users.

When the user wears the vehicle-mounted glasses, a visible area of the user's eyes corresponds to the eyebox of the vehicle-mounted glasses. Therefore, the real world image may be converted to obtain a projection image matched with the eyebox of the vehicle-mounted glasses, and the projection image is matched with the visible area of the user's eyes. The AR navigation is performed based on superimposing the navigation information on the projection image, which may ensure the effect of the AR navigation, provide the augmented reality experience to the user, and avoid affecting the effect of the AR navigation due to a movement of the user's head.

In practice, since a position of the user's head may change at any time, an adjustment period may be set, and the real world image is periodically converted to ensure the effect of the AR navigation. As an example, the adjustment period may be two seconds.

In embodiments of the present disclosure, after the navigation image is generated, the navigation image may be transmitted to the vehicle-mounted glasses, and the navigation image may be displayed through the vehicle-mounted glasses to achieve the AR navigation. The AR navigation being projected on the vehicle-mounted glasses may overcome the defects of projecting the AR navigation on the screen of the IVI system or the AR HUD in the related art, and may improve the user's experience.

In the method provided by embodiments of the present disclosure, the real world image and the navigation information are acquired by the IVI system, the real world image is converted, by the IVI system, to obtain the projection image, and the projection image is matched with the eyebox of at least one pair of vehicle-mounted glasses, the navigation information is superimposed on the projection image to obtain the navigation image, and the navigation image is transmitted to the vehicle-mounted glasses, and displayed by the vehicle-mounted glasses. In the solution, the AR navigation is implemented based on the vehicle-mounted glasses, and an influence on the effect of the AR navigation caused by the change of the position of the user's head may be avoided, so as to ensure the effect of the AR navigation and the user's experience.

Figure 3:
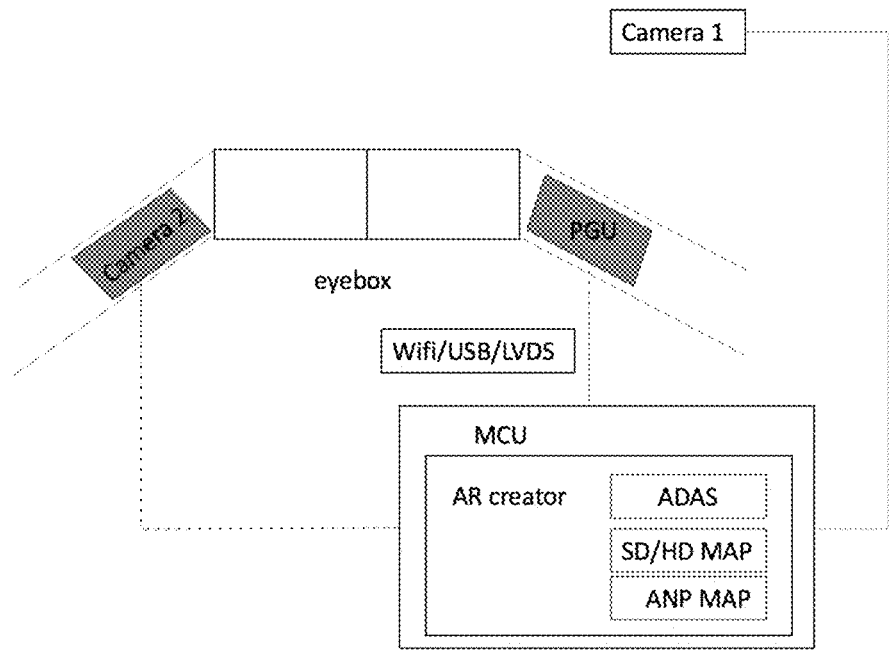
FIG. 3 shows a schematic structural diagram of a navigation system provided by an embodiment of the present disclosure.

FIG. 3 shows a schematic structural diagram of a navigation system provided by an embodiment of the present disclosure.

As shown in FIG. 3, Camera1 is a first image capturing device of the IVI system; Camera2 is a second image capturing device of vehicle-mounted glasses; eyebox is a viewing window; MCU is a MCU of the IVI system; AR creator is an augmented reality software suite including an ADAS (Advanced Driving Assistance System), a SD/HD MAP (Standard Definition Map or High Definition Map), and an ANP (Apollo Navigation Pilot) map.

A first real world image captured by Camera1 and a second real world image captured by Camera2 may be transmitted to the MCU. After a navigation image is generated in the MCU, the navigation image may be transmitted to a PGU (an image generation unit) of the vehicle-mounted glasses through wireless transmission (such as Wi-Fi), etc., and the navigation image is displayed by the PGU.

Figure 4:
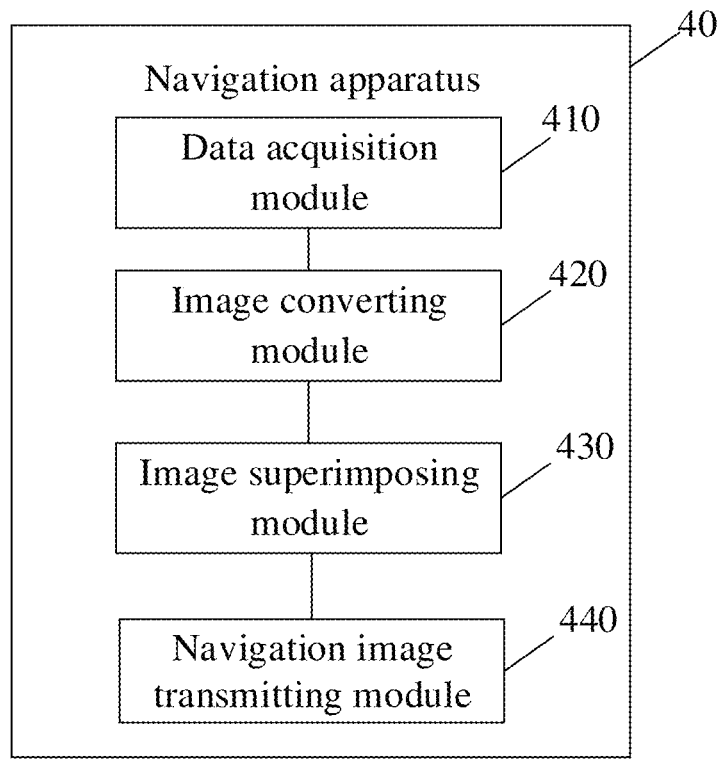
FIG. 4 shows a schematic structural diagram of a navigation apparatus provided by the present disclosure.

Based on the same principle as the method shown in FIG. 1, FIG. 4 shows a schematic structural diagram of a navigation apparatus provided by an embodiment of the present disclosure. As shown in FIG. 4, the navigation apparatus 40 may include: a data acquisition module 410 used to acquire a real world image and a navigation information; an image converting module 420 used to convert the real world image to obtain a projection image, wherein the projection image is matched with an eyebox of at least one pair of vehicle-mounted glasses; an image superimposing module 430 used to superimpose the navigation information on the projection image to obtain a navigation image; and a navigation image transmitting module 440 used to transmit to the vehicle-mounted glasses the navigation image so that the navigation image is displayed by the vehicle-mounted glasses.

In the apparatus provided by embodiments of the present disclosure, the real world image and the navigation information are acquired; the real world image is converted to obtain the projection image, the projection image is matched with the eyebox of at least one pair of vehicle-mounted glasses; the navigation information is superimposed on the projection image to obtain the navigation image; and the navigation image is transmitted to the vehicle-mounted glasses, and displayed by the vehicle-mounted glasses. In the solution, the AR navigation is implemented based on the vehicle-mounted glasses, and an influence on the effect of the AR navigation caused by the change of the position of the user's head may be avoided, so as to ensure the effect of the AR navigation and the user's experience.

Optionally, if the real world image is a first real world image captured by a first image capturing device of the IVI system, when the image converting module is used to convert the real world image to obtain the projection image, it specifically performs the following: a first positional relationship between a second real world image captured by a second image capturing device of the vehicle-mounted glasses and the eyebox of the vehicle-mounted glasses is acquired; a second positional relationship between the first real world image and the second real world image is determined; and the first real world image is converted to obtain the projection image, based on the first positional relationship and the second positional relationship.

Optionally, when the image converting module acquires the first positional relationship between the second real world image captured by the second image capturing device of the vehicle-mounted glasses and the eyebox of the vehicle-mounted glasses, it specifically performs the following: the first positional relationship is determined based on a position of the second image capturing device and a position of the eyebox of the vehicle-mounted glasses.

Optionally, when the image converting module is used to determine the second positional relationship between the first real world image and the second real world image, it specifically performs any one of the followings: feature point tracking is performed on the first real world image and the second real world image, and the second positional relationship between the first real world image and the second real world image is determined based on a first result of the feature point tracking; or feature point tracking is performed on a third real world image which is captured when the vehicle-mounted glasses is located at a specified position and the first real world image, a third positional relationship between the first real world image and the third real world image is determined based on a second result of the feature point tracking, and the second positional relationship between the first real world image and the second real world image is determined, based on a current position of the vehicle-mounted glasses, the specified position, and the third positional relationship.

Optionally, the current position of the vehicle-mounted glasses is obtained based on the positioning system of the vehicle-mounted glasses.

Optionally, if the real world image is the second real world image captured by the second image capturing device of the vehicle-mounted glasses, when the image converting module is used to convert the real world image to obtain the projection image, it specifically performs the following: the first positional relationship between the second real world image captured by the second image capturing device of the vehicle-mounted glasses and the eyebox of the vehicle-mounted glasses is acquired; and the first real world image is converted to obtain the projection image based on the first positional relationship.

Optionally, when the navigate image transmitting module is used to transmit the navigation image to the vehicle-mounted glasses, it specifically performs the following: the navigation image is transmitted to the vehicle-mounted glasses through wireless communication.

It should be understood that each module described above of the navigation apparatus in embodiments of the present disclosure have a function of implementing a corresponding step of the navigation method in embodiments shown in FIG. 1. The function may be implemented by hardware or by executing a corresponding software by hardware. The hardware or software includes one or more modules corresponding to the above functions. The above-mentioned modules may be software and/or hardware, and each module described above may be implemented independently, or a plurality of modules may be implemented integrally. For description of functions of each module of the above-mentioned navigation apparatus, reference may be made to the corresponding descriptions of the navigation method in embodiments shown in FIG. 1, which will not be repeated here.

Figure 5:
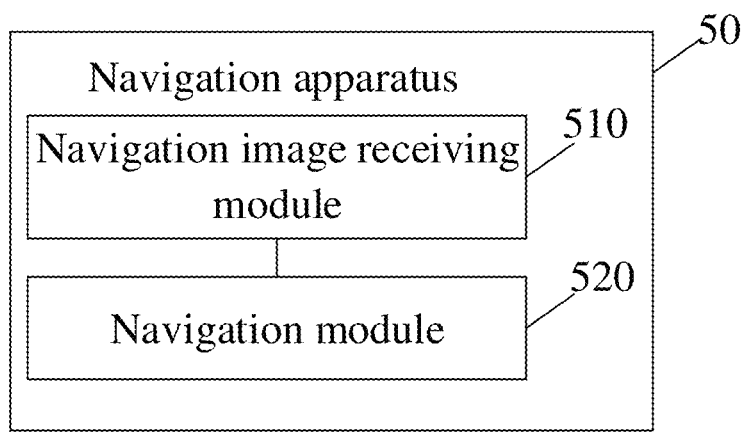
FIG. 5 shows a schematic structural diagram of another navigation apparatus provided by the present disclosure.

Based on the same principle as the method shown in FIG. 2, FIG. 5 shows a schematic structural diagram of a navigation apparatus provided by an embodiment of the present disclosure. As shown in FIG. 5, the navigation apparatus 50 may include: a navigation image receiving module 510 used to receive a navigation image transmitted by an IVI system, wherein the navigation image is obtained by superimposing the navigation information on a projection image, the projection image is obtained by converting the real world image, and the projection image is matched with an eyebox of at least one pair of vehicle-mounted glasses; and a navigation module 520 used to display the navigation image.

In the apparatus provided by embodiments of the present disclosure, the real world image and the navigation information are acquired by the IVI system; the real world image is converted, by the IVI system, to obtain the projection image, the projection image is matched with the eyebox of at least one pair of vehicle-mounted glasses; the navigation information is superimposed on the projection image to obtain the navigation image; and the navigation image is transmitted to the vehicle-mounted glasses, and displayed by the vehicle-mounted glasses. In the solution, the AR navigation is implemented based on the vehicle-mounted glasses, and an influence on the effect of the AR navigation caused by the change of the position of the user's head may be avoided, so as to ensure the effect of the AR navigation and the user's experience.

It should be understood that each module described above of the navigation apparatus in embodiments of the present disclosure have a function of implementing a corresponding step of the navigation method in the embodiment shown in FIG. 2. The function may be implemented by hardware or by executing a corresponding software by hardware. The hardware or software includes one or more modules corresponding to the above functions. The above-mentioned modules may be software and/or hardware, and each module described above may be implemented independently, or a plurality of modules may be implemented integrally. For description of functions of each module of the above-mentioned navigation apparatus, reference may be made to the corresponding descriptions of the navigation method in the embodiment shown in FIG. 2, which will not be repeated here.

In the technical solution of the present disclosure, the collection, storage, use, processing, transmission, provision, disclosure and application of the user's personal information involved are all in compliance with the provisions of relevant laws and regulations, and necessary confidentiality measures have been taken, and it does not violate public order and good morals. In the technical solution of the present disclosure, before obtaining or collecting the user's personal information, the user's authorization or consent is obtained.

According to embodiments of the present disclosure, the present disclosure further provides an electronic device, a readable storage medium, and a computer program product.

The electronic device may include: at least one processor; and a memory communicatively connected with the at least one processor; the memory stores instructions executable by the at least one processor, and the instructions, when executed by the at least one processor, cause the at least one processor to implement the navigation methods provided by embodiments of the present disclosure.

Different from the related art, the electronic device of the present disclosure can achieve the followings: the real world image and the navigation information are acquired; the real world image is converted to obtain the projection image, and the projection image is matched with the eyebox of at least one pair of vehicle-mounted glasses; the navigation information is superimposed on the projection image to obtain a navigation image; and the navigation image is transmitted to the vehicle-mounted glasses, and displayed by the vehicle-mounted glasses. In the solution, the AR navigation is implemented based on the vehicle-mounted glasses, and an influence on the effect of the AR navigation caused by the change of the position of the user's head may be avoided, so as to ensure the effect of the AR navigation and the user's experience.

The readable storage medium is a non-transitory computer-readable storage medium stored with computer instructions, and the computer instructions are used to cause a computer to implement the navigation methods provided by embodiments of the present disclosure.

Different from the related art, the readable storage medium of the present disclosure can achieve the followings: the real world image and the navigation information are acquired; the real world image is converted to obtain the projection image, and the projection image is matched with the eyebox of at least one pair of vehicle-mounted glasses; the navigation information is superimposed on the projection image to obtain the navigation image; and the navigation image is transmitted to the vehicle-mounted glasses, and displayed by the vehicle-mounted glasses. In the solution, the AR navigation is implemented based on the vehicle-mounted glasses, and an influence on the effect of the AR navigation caused by the change of the position of the user's head may be avoided, so as to ensure the effect of the AR navigation and the user's experience.

The computer program product may include a computer program which, when executed by a processor, causes the processor to implement the navigation methods provided by embodiments of the present disclosure.

Different from the related art, the computer program product of the present disclosure can achieve the followings: the real world image and the navigation information are acquired; the real world image is converted to obtain the projection image, and the projection image is matched with the eyebox of at least one pair of vehicle-mounted glasses; the navigation information is superimposed on the projection image to obtain the navigation image; and the navigation image is transmitted to the vehicle-mounted glasses, and displayed by the vehicle-mounted glasses. In the solution, the AR navigation is implemented based on the vehicle-mounted glasses, and an influence on the effect of the AR navigation caused by the change of the position of the user's head may be avoided, so as to ensure the effect of the AR navigation and the user's experience.

Figure 6:
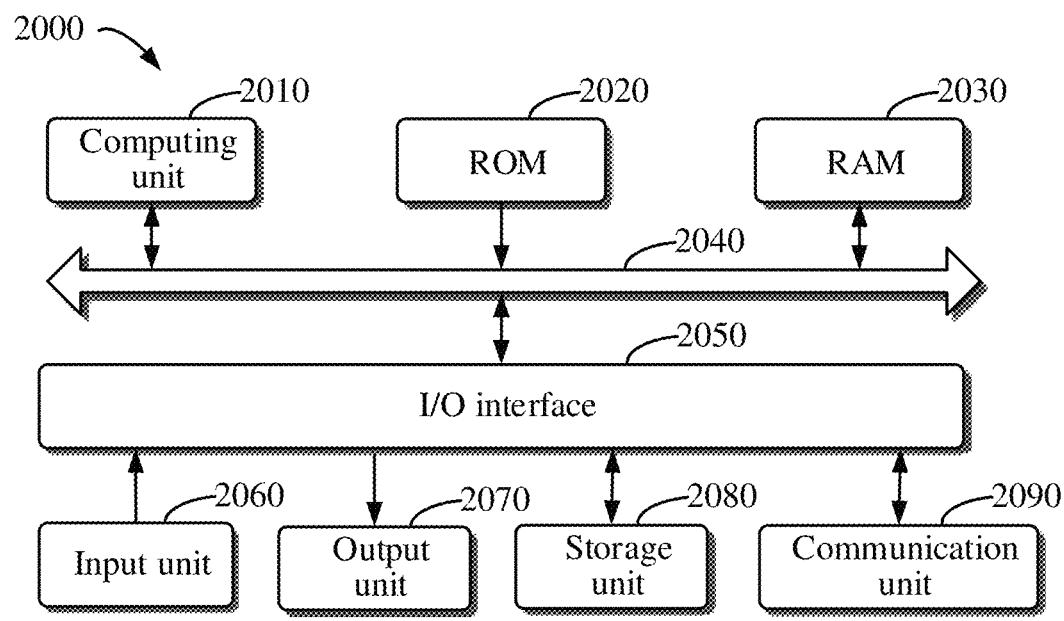
FIG. 6 shows a block diagram of an electronic device used to implement a navigation method of an embodiment of the present disclosure.

FIG. 6 shows a schematic block diagram of an exemplary electronic device 2000 for implementing embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 6, the electronic device 2000 may include a computing unit 2010, which may perform various appropriate actions and processing based on a computer program stored in a read-only memory (ROM) 2020 or a computer program loaded from a storage unit 2080 into a random access memory (RAM) 2030. Various programs and data required for the operation of the electronic device 2000 may be stored in the RAM 2030. The computing unit 2010, the ROM 2020 and the RAM 2030 are connected to each other through a bus 2040. An input/output (I/O) interface 2050 is also connected to the bus 2040.

Various components in the electronic device 2000, including an input unit 2060 such as a keyboard, a mouse, etc., an output unit 2070 such as various types of displays, speakers, etc., a storage unit 2080 such as a magnetic disk, an optical disk, etc., and a communication unit 2090 such as a network card, a modem, a wireless communication transceiver, etc., are connected to the I/O interface 2050. The communication unit 2090 allows the electronic device 2000 to exchange information/data with other devices through a computer network such as the Internet and/or various telecommunication networks.

The computing unit 2010 may be various general-purpose and/or special-purpose processing components with processing and computing capabilities. Some examples of the computing unit 2010 include but are not limited to a central processing unit (CPU), a graphics processing unit (GPU), various dedicated artificial intelligence (AI) computing chips, various computing units running machine learning model algorithms, a digital signal processor (DSP), and any appropriate processor, controller, microcontroller, and so on. The computing unit 2010 may perform the navigation methods provided by embodiments of the present disclosure. For example, in embodiments, the navigation methods provided by embodiments of the present disclosure may be implemented as a computer software program that is tangibly contained on a machine-readable medium, such as a storage unit 2080. In embodiments, part or all of a computer program may be loaded and/or installed on the electronic device 2000 via the ROM 2020 and/or the communication unit 2090. When the computer program is loaded into the RAM 2030 and executed by the computing unit 2010, one or more steps of the navigation methods provided by embodiments of the present disclosure may be performed. Alternatively, in other embodiments, the computing unit 2010 may be configured to perform the navigation methods provided by embodiments of the present disclosure in any other appropriate way (for example, by means of firmware).

Various embodiments of the systems and technologies described herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from the storage system, the at least one input device and the at least one output device, and may transmit the data and instructions to the storage system, the at least one input device, and the at least one output device.

Program codes for implementing the method of the present disclosure may be written in any combination of one or more programming languages. These program codes may be provided to a processor or a controller of a general-purpose computer, a special-purpose computer, or other programmable data processing devices, so that when the program codes are executed by the processor or the controller, the functions/operations specified in the flowchart and/or block diagram may be implemented. The program codes may be executed completely on the machine, partly on the machine, partly on the machine and partly on the remote machine as an independent software package, or completely on the remote machine or the server.

In the context of the present disclosure, the machine readable medium may be a tangible medium that may contain or store programs for use by or in combination with an instruction execution system, device or apparatus. The machine readable medium may be a machine-readable signal medium or a machine-readable storage medium. The machine readable medium may include, but not be limited to, electronic, magnetic, optical, electromagnetic, infrared or semiconductor systems, devices or apparatuses, or any suitable combination of the above. More specific examples of the machine readable storage medium may include electrical connections based on one or more wires, portable computer disks, hard disks, random access memory (RAM), read-only memory (ROM), erasable programmable read-only memory (EPROM or flash memory), optical fiber, convenient compact disk read-only memory (CD-ROM), optical storage device, magnetic storage device, or any suitable combination of the above.

In order to provide interaction with users, the systems and techniques described here may be implemented on a computer including a display device (for example, a CRT (cathode ray tube) or LCD (liquid crystal display) monitor) for displaying information to the user), and a keyboard and a pointing device (for example, a mouse or a trackball) through which the user may provide the input to the computer. Other types of devices may also be used to provide interaction with users. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and Internet.

The computer system may include a client and a server. The client and the server are generally far away from each other and usually interact through a communication network. The relationship between the client and the server is generated through computer programs running on the corresponding computers and having a client-server relationship with each other. The server may be a cloud server, and may also be a server of a distributed system, or a server combined with a block-chain.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A navigation method, comprising:
   acquiring a real world image and a navigation information;
   converting the real world image to obtain a projection image, wherein the projection image is matched with an eyebox of at least one pair of vehicle-mounted glasses;
   superimposing the navigation information on the projection image to obtain a navigation image; and
   transmitting to the vehicle-mounted glasses the navigation image so that the navigation image is displayed by the vehicle-mounted glasses.

2. The method according to claim 1, wherein in a case that the real world image is a first real world image captured by a first image capturing device of an in-vehicle infotainment system, the converting the real world image to obtain a projection image comprises:
   acquiring a first positional relationship between a second real world image captured by a second image capturing device of the vehicle-mounted glasses and the eyebox of the vehicle-mounted glasses;
   determining a second positional relationship between the first real world image and the second real world image; and
   converting the first real world image to obtain the projection image, based on the first positional relationship and the second positional relationship.

3. The method according to claim 2, wherein the acquiring a first positional relationship between a second real world image captured by a second image capturing device of the vehicle-mounted glasses and the eyebox of the vehicle-mounted glasses comprises determining the first positional relationship based on a position of the second image capturing device of the vehicle-mounted glasses and a position of the eyebox.

4. The method according to claim 2, wherein the determining a second positional relationship between the first real world image and the second real world image comprises:
   performing feature point tracking on the first real world image and the second real world image, and determining the second positional relationship between the first real world image and the second real world image based on a first result of the feature point tracking; or
   performing feature point tracking on a third real world image which is captured when the vehicle-mounted glasses is located at a specified position and the first real world image, determining a third positional relationship between the first real world image and the third real world image based on a second result of the feature point tracking, and determining the second positional relationship between the first real world image and the second real world image, based on a current position of the vehicle-mounted glasses, the specified position, and the third positional relationship.

5. The method according to claim 4, wherein the current position of the vehicle-mounted glasses is obtained based on a positioning system of the vehicle-mounted glasses.

6. The method according to claim 1, wherein in a case that the real world image is a second real world image captured by a second image capturing device of the vehicle-mounted glasses, the converting the real world image to obtain a projection image comprises:
   acquiring a first positional relationship between the second real world image captured by the second image capturing device of the vehicle-mounted glasses and the eyebox of the vehicle-mounted glasses; and
   converting the first real world image to obtain the projection image based on the first positional relationship.

7. The method according to claim 4, wherein the transmitting to the vehicle-mounted glasses the navigation image comprises transmitting to the vehicle-mounted glasses the navigation image through wireless communication.

8. The method according to claim 3, wherein the determining a second positional relationship between the first real world image and the second real world image comprises:

performing feature point tracking on the first real world image and the second real world image, and determining the second positional relationship between the first real world image and the second real world image based on a first result of the feature point tracking; or performing feature point tracking on a third real world image which is captured when the vehicle-mounted glasses is located at a specified position and the first real world image, determining a third positional relationship between the first real world image and the third real world image based on a second result of the feature point tracking, and determining the second positional relationship between the first real world image and the second real world image, based on a current position of the vehicle-mounted glasses, the specified position, and the third positional relationship.

9. The method according to claim 2, wherein in a case that the real world image is a second real world image captured by a second image capturing device of the vehicle-mounted glasses, the converting the real world image to obtain a projection image comprises:

acquiring a first positional relationship between the second real world image captured by the second image capturing device of the vehicle-mounted glasses and the eyebox of the vehicle-mounted glasses; and converting the first real world image to obtain the projection image based on the first positional relationship.

10. The method according to claim 3, wherein in a case that the real world image is a second real world image captured by a second image capturing device of the vehicle-mounted glasses, the converting the real world image to obtain a projection image comprises:

acquiring a first positional relationship between the second real world image captured by the second image capturing device of the vehicle-mounted glasses and the eyebox of the vehicle-mounted glasses; and converting the first real world image to obtain the projection image based on the first positional relationship.

11. The method according to claim 4, wherein in a case that the real world image is a second real world image captured by a second image capturing device of the vehicle-mounted glasses, the converting the real world image to obtain a projection image comprises:

acquiring a first positional relationship between the second real world image captured by the second image capturing device of the vehicle-mounted glasses and the eyebox of the vehicle-mounted glasses; and converting the first real world image to obtain the projection image based on the first positional relationship.

12. The method according to claim 5, wherein in a case that the real world image is a second real world image captured by a second image capturing device of the vehicle-mounted glasses, the converting the real world image to obtain a projection image comprises:

acquiring a first positional relationship between the second real world image captured by the second image capturing device of the vehicle-mounted glasses and the eyebox of the vehicle-mounted glasses; and converting the first real world image to obtain the projection image based on the first positional relationship.

13. A navigation method, comprising:

receiving a navigation image transmitted by an in-vehicle infotainment system, wherein the navigation image is obtained by superimposing a navigation information on a projection image, the projection image is obtained by converting a real world image, and the projection image is matched with an eyebox of at least one pair of vehicle-mounted glasses; and displaying the navigation image.

14. An electronic device, comprising:

at least one processor; and a memory communicatively connected with the at least one processor; wherein the memory stores instructions executable by the at least one processor, and the instructions, when executed by the at least one processor, cause the at least one processor to at least:

acquire a real world image and a navigation information;

convert the real world image to obtain a projection image, wherein the projection image is matched with an eyebox of at least one pair of vehicle-mounted glasses;

superimpose the navigation information on the projection image to obtain a navigation image; and transmit to the vehicle-mounted glasses the navigation image so that the navigation image is displayed by the vehicle-mounted glasses.

15. The electronic device according to claim 14, wherein the instructions are further configured to cause the at least one processor to: in a case that the real world image is a first real world image captured by a first image capturing device of an in-vehicle infotainment system, acquire a first positional relationship between a second real world image captured by a second image capturing device of the vehicle-mounted glasses and the eyebox of the vehicle-mounted glasses;

determine a second positional relationship between the first real world image and the second real world image; and convert the first real world image to obtain the projection image, based on the first positional relationship and the second positional relationship.

16. The electronic device according to claim 15, wherein the instructions are further configured to cause the at least one processor to determine the first positional relationship based on a position of the second image capturing device of the vehicle-mounted glasses and a position of the eyebox.

17. The electronic device according to claim 15, wherein the instructions are further configured to cause the at least one processor to:

perform feature point tracking on the first real world image and the second real world image, and determine the second positional relationship between the first real world image and the second real world image based on a first result of the feature point tracking; or perform feature point tracking on a third real world image which is captured when the vehicle-mounted glasses is located at a specified position and the first real world image, determine a third positional relationship between the first real world image and the third real world image based on a second result of the feature point tracking, and determine the second positional relationship between the first real world image and the second real world image, based on a current position of the vehicle-mounted glasses, the specified position, and the third positional relationship.

18. The electronic device according to claim 16, wherein the instructions are further configured to cause the at least one processor to:

perform feature point tracking on the first real world image and the second real world image, and determine the second positional relationship between the first real world image and the second real world image based on a first result of the feature point tracking; or perform feature point tracking on a third real world image which is captured when the vehicle-mounted glasses is located at a specified position and the first real world image, determine a third positional relationship between the first real world image and the third real world image based on a second result of the feature point tracking, and determine the second positional relationship between the first real world image and the second real world image, based on a current position of the vehicle-mounted glasses, the specified position, and the third positional relationship.

19. A non-transitory computer-readable storage medium having computer instructions therein, the computer instructions, when executed by a computer system, configured to cause the computer system to implement at least the method according to claim 1.

20. A non-transitory computer-readable storage medium having computer instructions therein, the computer instructions, when executed by a computer system, configured to cause the computer system to implement at least the method according to claim 13.

* * * * *